Feb. 26, 1963 T. J. MACOSKO 3,078,545
APPARATUS AND PROCESS FOR CONTINUOUS PROFILE
FORMATION OF A ROD WORKPIECE
Filed Jan. 8, 1957
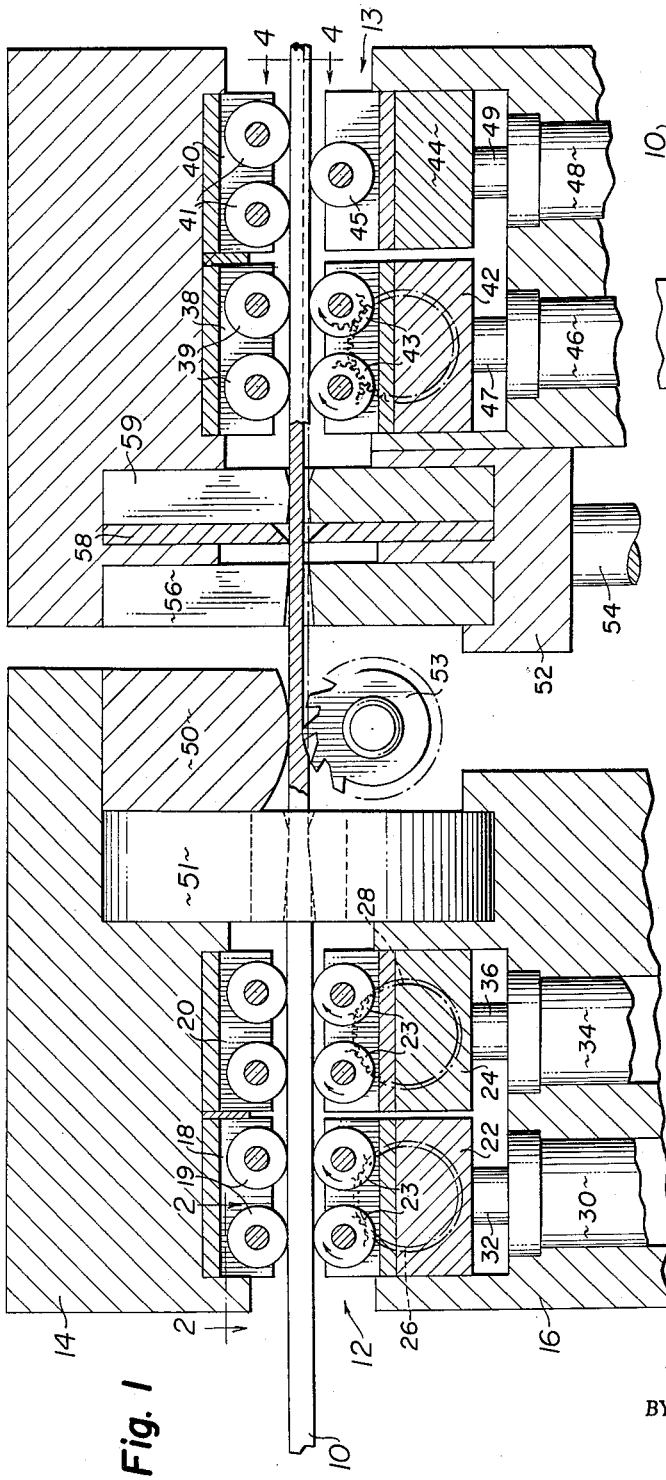
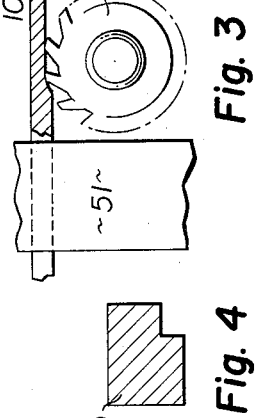
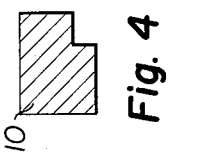
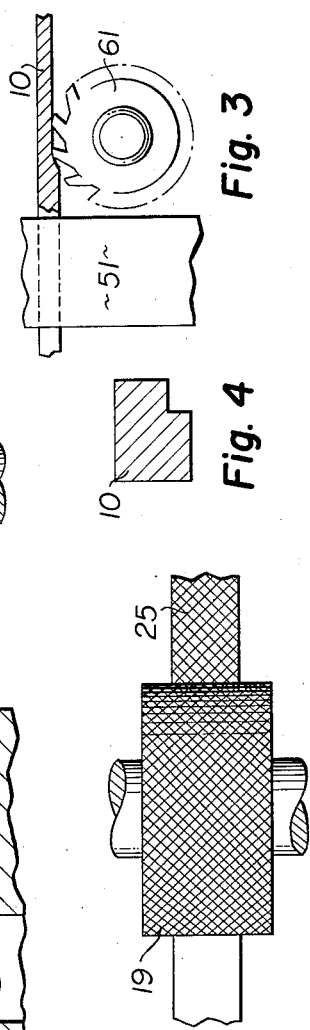
INVENTOR.
THEODORE J. MACOSKO
BY Pyle and Fisher
ATTORNEYS

United States Patent Office 3,078,545
Patented Feb. 26, 1963

3,078,545
APPARATUS AND PROCESS FOR CONTINUOUS
PROFILE FORMATION OF A ROD WORKPIECE
Theodore J. Macosko, Berea, Ohio, assignor, by mesne assignments, to Aerospace Metals Corporation, a corporation of Delaware
Filed Jan. 8, 1957, Ser. No. 633,128
6 Claims. (Cl. 29—33)

This invention relates in general to continuous contour forming apparatus and methods, and relates more specifically to cold forming, machining, and sizing of stock in continuous lengths, such as for example, the cold drawing to size followed by milling in a bar of stock.

Continuous machining is generically an old and well known process, continuous milling is the most common example, and as practiced prior to this invention is little more than a means of compensating for the lack of sufficient table length in a conventional milling machine. Milling of shorter lengths within the capacity of the mill table is continuous milling of workpiece bars, and to merely draw a longer workpiece bar through guide devices is a substitute for an extremely over-sized table.

The present invention has for its principal object the creation of two closely spaced stability points establishing a workfield therebetween and the production of a taut condition for a workpiece passing through this workfield.

Another object of this invention is the provision of reaction countering devices located in proximity to a milling cutter to counteract lateral components of forces produced by the milling action and thereby substantially eliminating off tolerances and defects caused by vibration.

Another object of this invention is to provide a draw die and a burnishing die in spaced relationship to create stability points and establish a workfield.

Another object of this invention is to have the draw die serve as the force reacting member to counteract the lateral reaction forces.

Another object of this invention is to establish a drive device forward of the draw die and a pulling device aft of the burnishing die in the workpath to thereby force a workpiece to move smoothly along the workpath and remain taut within the workfield.

Still another object of this invention is related principally to the drawing action, and comprises the establishment of a regular pattern of minute surface irregularities in order that drawing lubricant may be carried deep into the draw die by the irregularities for lubrication of the drawing action.

Other objects and a fuller understanding of the invention may be had by referring to the following description and claims, taken in conjunction with the accompanying drawing, in which:

FIGURE 1 is a somewhat schematic illustration of the arrangement and cooperative relationship of machine components with a workpice bar being processed according to the teachings of this invention;

FIG. 2 is a plan view of a drive roller taken along line. 2—2 of FIGURE 1;

FIGURE 3 is a fragmentary view of the machining area of the workpath, showing a milling head performing climb milling, as contrasted to conventional milling shown in FIGURE 1, and;

FIGURE 4 is a cross section of the workpiece as taken along line 4—4 of FIGURE 1.

A conventional milling machine will undoubtedly be employed in most instances as a basic power device to hold and rotate a machining member such as a milling head for the purposes of this invention. However, it is to be understood at the outset that this invention is not in any way related to any machine tool, but is in fact a new apparatus for carrying out an improved process of advancing a workpiece along a workpath; drawing the raw stock and burnishing the finished contour to proper size and surface finish; and employing the workfield thus established to produce a tensioned workpiece condition within the established workfield for better continuous machining performance.

The drawing is somewhat schematic in order that the import of the invention may not be overlooked or mistakingly attributed to some design of a machine tool or piece of equipment. The FIGURE 1 illustrates a continuous milling operation being carried out on a workpiece 10 having a generally rectangular cross-sectional configuration as raw stock, and being milled to a notched configuration, as shown in the cross-sectional view of FIGURE 3.

In the illustrated embodiment of the invention a push drive apparatus, or first drive, is indicated generally by the reference character 12 and a pull drive apparatus, or second drive, is indicated by the reference character 13. A draw die 51 is located subsequent to the first drive 12. A burnishing die 59 is located just prior to the second drive 13. Between the draw die 51 and the burnishing die 59 a workfield is established having very desirable characteristics which will be more fully explained hereafter. In this field, there is located a milling cutter 53. The particular cutter illustrated in FIGURE 1 is designed to cut in a conventional direction. A similar cutter 61 shown in FIGURE 3 is designed to cut in the reverse direction. Other machining tools may be employed as needed. This reverse cutting in the environment illustrated in FIGURE 3 will produce a cut known as climb milling.

As a matter of convenience, a guide 56 is located just subsequent to the milling head 53 in order to pick up the projecting end of a workpiece and guide that workpice properly into the opening of the subsequently positioned burnishing die 59. Between the guide 56 and burnishing die 59 is located a scraper blade 58 to remove burrs and other foreign matter which may tend to cling to the milled workpiece and score the burnishing die 59. Brush devices may, of course, be substituted or added.

These are the fundamental components needed for a basic understanding of the invention. More detailed explanation of the illustrated embodiment of the invention will be set forth hereinafter.

In the effort to produce a continuous milling apparatus which would not have the limitations and undesirable aspects of prior art devices, several unexpected and desirable results were produced. As will be well understood by those familiar with machining in general, and continuous milling in particular, the very act of continuous milling necessitates allowing an area of the workpiece to be not thoroughly secured. The workpiece must be free to advance relative to fixed portions of the apparatus. Vibration has often been the limiting result of such inability to clamp the workpiece. This invention has substantially solved the vibration problem by the joint operation of two new provisions, comprising establishment of a taut field and of providing a reaction force countering device exactly where the forces are greatest. This invention preferably incorporates a draw die to bring the workpiece to a desired beginning cross-sectional configuration for purposes such as assuring accurate machine reference surfaces. The use of such a draw die cooperates perfectly with the taut workfield conception of this invention.

First with respect to the taut field, it is a major discovery of this invention that an unsecured workpiece moving against reaction anvils in a workfield may be much more accurately and rapidly machined if stretched taut between two very closely spaced stability points. Straight tensioning on a long worpiece bar will permit extremely long periods of vibration. This invention provides two stability points as close as reasonably possible to the machining tool member and establishes a tension between these two points in order to produce a taut workpiece condition which can have only very short vibration periods. What takes place beyond the stability points is of only secondary interest with respect to this invention. It has been found from actual experience that the provision of the taut workpiece field between such closely spaced stability points produces an ideal metal working environment and when machining allows greater cutting speeds than is possible without this provision.

As before indicated, workpiece bars are often not finished to the precise size and shape suitable for use as finished goods. All surfaces of a workpiece bar are not machined in a continuous milling operation. Some remain in their original condition. More important, depth of cut is established by placement of reaction members to act as guides of holding workpieces with respect to the cutting members. An accurately formed workpiece will permit accurate machining of the workpiece as it passes the machining station. Therefore, it has been found desirable to provide the draw die 51 for producing an accurate exterior contour on the workpiece bar 10 before machining. As before indicated, the best machining nevertheless produces a surface which is characteristic and accordingly the burnishing die 59 is desirable to smooth the machined surfaces. In this invention the apparatus takes advantage of the draw die 51 and the burnishing die 59 for establishment of the closely spaced stability points needed for the improvement process.

In the effort to produce both the draw feature and the taut workfield feature, an entirely new draw principle was discovered. It requires power to move the workpiece through both the draw die 51 and the burnishing die 59. In fact, the amount of power needed to draw the stock through the draw die 51 is quite large. Accordingly, it was found to be undesirable to use only draw force from the second drive 13 because of the likelihood of distorting or actually breaking the workpiece if enough power were applied by pulling alone to both draw and burnish the workpiece as well as counteract the force of the cutting action. Accordingly, the pushing first drive 12 is employed to grasp the workpiece 10 and drive it through the draw die 51. In order to obtain as much driving force as possible, the driving rollers, represented by reference characters 19 and 23 were knurled to produce a better grip upon the workpiece. Such knurled drive surfaces result in minute surface indentations on the workpiece. Instead of being a detriment, it was found that the drawing action was considerably improved, apparently for the reason that draw lubricant is carried uniformly into the reducing area of the draw dies by the surface imperfections.

This improvement of the drawing action is an invention alone, but it was found further that the pulling drive created by the second drive member 13 could be established to a sufficient degree to produce not only enough force to pull the workpiece through the burnishing die 59, and to aid in overcoming the reaction force of cutting produced by the milling head 53, but if applied in sufficient force to tension the workpiece between the drawing and burnishing dies, a considerable improvement in machining quality and speed has taken place and the quality of the finished product is noticeably improved. This is the taut workfield concept. The apparatus of FIGURE 1, although only schematically illustrated, serves to set forth an embodiment of the invention which is believed to be the preferred embodiment. In more detail, the FIGURE 1 embodies carriage members 14 and 16 of the first drive 12. Anvil roller carriages 18 and 20 are provided with anvil rollers 19 to receive and guide the workpiece 10. A power roller carriage 22 is provided with rollers 23. The rollers 23, or the rollers 19, and preferably both sets of rollers, are knurled as shown in FIGURE 2 in order to produce a better driving grip upon the workpiece 10. The knurled surfaces produce resultant surface indentations which have been referred to as the surfaces which tend to carry draw lubricant into the draw die 51. The resultant surface formation is indicated by the reference character 25 in FIGURE 2. Rollers may be positioned to indent all bar surfaces, if needed for best draw lubrication.

A second power roller carriage 24 carries a second set of rollers 23. A drive gear 26 on the carriage 22 and drive gear 28 on the carriage 24 are geared to the rollers 23 in order to transmit driving power from any suitable driving source. A motor or other driving source has not been illustrated because such driving means are well known in the art and would serve no useful purpose in being illustrated here.

A piston 30 having a hydraulically actuated ram 32 may be employed to drive the carriage 22 and force the rollers 23 into contact with the workpiece 10 with whatever degree of force may be necessary to properly grip the workpiece without slipping and to produce the requisite depth of the knurled surface 25. A piston 34 and ram 36 perform a similar function for the carriage 24.

The pull, or second drive, at the right of the FIGURE 1, may incorporate any suitable pulling means, but preferably embodies a roller carriage 38 having anvil rollers 39, and a power roller carriage 42 having power rollers 43. Combinations of pulling means may be resorted to for special circumstances. Carriage 42 is actuated by a piston 46 and ram 47 in the manner described for the first drive apparatus. Another power source, or the same power source, may be employed to drive the rollers 43. Preferably a second and independent power source is to be employed in order that the degree of tensioning of the workpiece 10 in the tensioned workfield between the stability points may be regulated. An independent control is particularly desirable if much draw extension takes place in the die 51.

An important difference exists between the rollers 39 and 43 as compared to their counter parts in the rollers 19 and 23 in that the rollers 39 and 43 are smooth in order to avoid any resultant surface markings.

A second roller carriage 40 with rollers 41 is opposed by a power roller carriage 44 having a singular roller 45. A piston 48 with ram 49 provides the actuating power. It would appear that the carriages 40 and 44 perform the same function as the previously described carriage, but examination will indicate that the roller 45 is not necessarily powered although it could possibly be provided with driving power. Furthermore, there is only one roller 45 on the carriage 44. The purpose of this arrangement is to provide counter bending forces upon the workpiece after it has been machined. All rod workpieces will have a tendency to curl if more machining is done on one side than on the other. Consequently workpieces coming from the illustrated apparatus will tend to curl. The triple rollers 41 and 45 are provided to produce a counter curling effect. By placing the roller 45 between the rollers 41 it may be readily understood that a bending action takes place. The degree of pressure applied to roller 45 by the ram 49 will determine the degree to counter bending.

Guide 56, knives 58, and burnishing die 59 are not under the very high forces imposed upon the draw die 51 and therefore are preferably segmental. Carriage 52 and one ram 54 provide holding force.

A force may be resolved into two components. This engineering fact is used to advantage in this invention. A machining operation requires an active force upon the workpiece with a reactive force or forces opposed. As each tooth of cutter 53 passes through its workpath it will create a moving force which must be countered at all times to produce a proper cut or any cut at all. A guide anvil 50 will easily counter all lateral forces tending to drive the workpiece in that direction. The cutting action produces forces in other directions. As a tooth begins its cut the first resultant forces are largely in the direction of anvil 50. Later a component of force will develop in the path of the workpiece. Thereafter a lateral component will develop in a lateral direction opposite the anvil 50 as the tooth nears the end of its cutting path. A reaction anvil to oppose this component of force has been found to produce workpiece accuracy and cutting speed far beyond the expected result. This later component of force opposite anvil 50 has been a continual source of trouble in past machining operations. The taut workfield referred to eliminates much of this difficulty. An extremely beneficial result has been found to ensue from the placement of the draw die 51 as the reaction anvil in closely spaced proximity to the cutter 53. The reaction anvil, which is the draw die 51 in the preferred embodiment, is located as close as possible to the strongest center of the lateral component of reaction forces.

FIGURE 1 illustrates the passing of a workpiece over the top of a mill with the cutter 53 acting in conventional fashion to start its cut and producing a chip which has a knife edge at the start with a gradual increase in chip size as the cut progresses to the time that the cutter drops free of the workpiece. The anvil 50 absorbs the direct lateral component of forces resulting in an upwardly direction as a result of this cutting action, and the die 51 absorbs the opposed and offset forces in the opposite direction forward of the cutter. This cutting action shown in FIGURE 1 is conventional milling.

The method and apparatus as thus described has many advantages which should now be apparent. One which may not be quite as apparent is the fact that the parts made by this process are more acceptable to the aircraft industry than by fully drawn or other types of operations. Drawn surfaces usually exhibit minute surface defects. By this process and by the apparatus described, this invention provides for a drawing action which materially aids in the economy of providing the finished parts by reason of conservation of material. The surfaces are then fully machined and later burnished. Accordingly, a smooth finish may be accomplished without the possibility of inherent surface defects.

In FIGURE 3 there is illustrated a reverse direction cutter in the form of the milling cutter 61 previously indicated. The cutting action of milling cutter 61 is referred to as climb milling and takes place by the milling teeth taking a full cut into the surface at the beginning and the cut then feathering out as it proceeds. Such climb milling is much to be desired in many respects because the cutting force is added to the drive action of the first and second drives and far less reaction anvil surfaces are required. There are other advantages, of course, but the practical application of such climb milling has not as yet been fully accomplished for all types of workpieces. However, if climb milling is to be used, then fully automatic devices must be provided to pull away the cutter and all associated equipment just as the workpiece pulls free of the draw die. The driving force of the climb mill, if not counteracted by the retarding of the draw die, may cause damage to the equipment.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim:

1. Apparatus for forming the cross sectional configuration of a bar workpiece, comprising, a rotating cutter, a first and second workpiece drive device, said first and second drive device and the cutter establishing a workpath, a draw die between said first drive device and said cutter head establishing a cold drawn uniform cross section workpiece prior to machining, said cutter producing cutting reaction forces when acting on a workpiece which forces are resolvable into longitudinal forces along said workpiece and lateral forces across said workpiece, an anvil member on the side of said workpiece location opposite said cutter to resist those lateral forces acting away from the cutter, said draw die positioned in close proximity to the cutter to resist the said lateral forces created by the cutter as the cutter teeth emerge from the cut being being made in the workpiece, said first drive device producing a thrust on the workpiece to drive the workpiece through the draw die and into the cutter head, said second drive device pulling the workpiece from the cutter, and means regulating said drive devices to create a positive high tension pull between the die and second drive device thereby establishing a tension on the workpiece in the cutting area between said first and second drive device.

2. Apparatus for forming a cross-sectional configuration into a bar workpiece, comprising, a first workpiece drive means, a second workpiece drive means spaced from said first drive means, said first and second drive means establishing a common workpiece workpath, a milling cutter located to work on a workpiece in said workpath between the drive means, said milling cutter being rotatable to cut said workpiece in the direction of workpiece travel with a climb milling action, said cutter producing highly variable cutting reaction forces when acting on a workpiece which forces are resolvable into large longitudinal forces along said workpiece in the direction of workpiece movement and lateral forces across said workpieces, reaction anvil means positioned on the side of said workpiece location opposite to the cutter to resist the said lateral forces, a draw die between said first drive means and said milling cutter, said first drive means providing a push drive force toward said milling cutter and said second drive means providing a pull drive force from said milling cutter, and means regulating said drive devices to create a positive high tension pull between the die and second drive device, whereby the workpiece is maintainable in a high state of tension while being continuously milled regardless of drive variations of the milling cutter.

3. Apparatus for forming a cross-sectional configuration into a bar workpiece, comprising, a first workpiece drive means, a second workpiece drive means spaced from said first drive means, said first and second drive means establishing a common workpiece workpath, a milling cutter located to work on a workpiece in said workpath between the drive means, said milling cutter being rotatable to cut said workpiece in the direction of workpiece travel with a climb milling action, said cutter producing highly variable cutting reaction forces when acting on a workpiece which forces are resolvable into large longitudinal forces along said workpiece in the direction of workpiece movement and lateral forces across said workpieces, a draw die in close proximity to the cutter positioned to resist the said lateral forces, and means regulating said drive devices to create a positive high tension pull between the die and second drive device, whereby the workpiece is maintainable in a high state of tension while being continuously milled regardless of drive variations of the milling cutter, said first drive means providing a push drive force toward said milling cutter and said second drive means providing a pull drive force from said milling cutter, a burnishing die having burnishing surfaces formed to the desired contour of the finished workpiece, said burnishing die positioned between the said second drive means and the cutter to receive the machined workpiece as it leaves the cutter, said burnishing die providing a stability point, said draw die providing a stability point, said second drive means being regulatable for producing a tension upon the workpiece bar to create a taut workpiece condition upon the workpiece bar between said stability points, regardless of the drive variations of the milling cutter.

4. Apparatus for forming a cross sectional configuration into a bar workpiece, comprising, a first workpiece drive means, a second workpiece drive means spaced from said first drive means, said first and second drive means establishing a common workpiece workpath, a milling cutter located to work on a workpiece in said workpath between the drive means, said milling cutter being rotatable to cut said workpiece in the direction of workpiece travel with a climb milling action, said cutter producing highly variable cutting reaction forces when acting on a workpiece which forces are resolvable into large longitudinal forces along said workpiece in the direction of workpiece movement and lateral forces across said workpieces, a draw die forward of and in close proximity to the cutter to resist the said lateral forces created by the cutter as the cutter teeth emerge from the cut being made in the workpiece, means acting to remove loose chips and foreign material as the workpiece progresses past the milling cutter, and a burnishing die having burnishing surfaces formed to the desired contour of the finished workpiece, said burnishing die positioned prior to said second drive means to receive the machine and cleaned workpiece as it leaves the cutter, said burnishing die and said draw die providing closely spaced stability points establishing a workfield, said second drive means regulatable for producing a tension upon the workpiece to create a taut workpiece condition in said workfield between said stability points, said first drive means providing a push drive force toward said milling cutter and said second drive means providing a pull drive force from said milling cutter.

5. Apparatus for draw forming a workpiece bar, comprising, a draw die, said draw die having an opening through which workpiece bars may be drawn, said opening having a longitudinal axis establishing a workpath, a roller member having a peripheral surface, said roller having an axis of rotation extending at a 90-degree angle and at spaced distance with respect to said workpath, said axis positioned to place said roller surface in rolling contact with a workpiece in said workpath forward of said draw die, means placing said roller member under pressure upon a workpiece bar, said roller surface having protrusions producing resultant indentations in the workpiece bar, and means to move said workpiece bar past said roller and through said draw die.

6. In the draw die apparatus of claim 5, the provision of a plurality of said roller members, and drive means rotatably driving said roller members to thereby drive the bar through the die, whereby the protrusions can carry minute amounts of any draw die lubricant beyond the initial contact point of the die.

References Cited in the file of this patent
UNITED STATES PATENTS

| | | |
|---|---|---|
| 738,932 | O'Donnell | Sept. 15, 1903 |
| 1,079,739 | Barbour | Nov. 25, 1913 |
| 1,109,050 | Dunn | Sept. 1, 1914 |
| 1,194,617 | Goss | Aug. 15, 1916 |
| 1,962,896 | Dewalt | June 12, 1934 |
| 2,032,917 | Cushwa | Mar. 3, 1936 |
| 2,071,619 | Fiegel | Feb. 23, 1937 |
| 2,233,928 | Weaver | Mar. 4, 1941 |
| 2,290,061 | Matia | July 14, 1942 |
| 2,323,700 | Bailey | July 6, 1943 |
| 2,327,531 | Koch | Aug. 24, 1943 |
| 2,333,238 | Finnie | Nov. 2, 1943 |
| 2,577,116 | Fassnacht | Dec. 4, 1951 |
| 2,736,670 | Griffiths | Feb. 28, 1956 |
| 2,882,759 | Altwicker | Apr. 21, 1959 |
| 2,894,623 | Walton | July 14, 1959 |

FOREIGN PATENTS

| | | |
|---|---|---|
| 3,834 | Great Britain | 1904 |